(12) United States Patent
Lee et al.

(10) Patent No.: US 10,850,590 B2
(45) Date of Patent: Dec. 1, 2020

(54) THERMAL MANAGEMENT SYSTEM FOR VEHICLE

(71) Applicant: HANON SYSTEMS, Daejeon (KR)

(72) Inventors: Hae Jun Lee, Daejeon (KR); Sung Je Lee, Daejeon (KR); Hyeong Kyu Jin, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 70 days.

(21) Appl. No.: 16/323,564

(22) PCT Filed: Nov. 21, 2017

(86) PCT No.: PCT/KR2017/013245
§ 371 (c)(1),
(2) Date: Feb. 6, 2019

(87) PCT Pub. No.: WO2018/105928
PCT Pub. Date: Jun. 14, 2018

(65) Prior Publication Data
US 2019/0168570 A1    Jun. 6, 2019

(30) Foreign Application Priority Data

Dec. 7, 2016 (KR) .................. 10-2016-0165989

(51) Int. Cl.
*F25B 29/00* (2006.01)
*B60H 1/00* (2006.01)
(Continued)

(52) U.S. Cl.
CPC .......... *B60H 1/00492* (2013.01); *B60H 1/00* (2013.01); *B60H 1/00278* (2013.01); *B60H 1/22* (2013.01);
(Continued)

(58) Field of Classification Search
CPC .. B60H 1/00492; B60H 1/00; B60H 1/00278; B60H 1/22; B60H 1/32;
(Continued)

(56) References Cited

U.S. PATENT DOCUMENTS 7,841,431 B2    11/2010 Zhou
9,827,846 B2 *  11/2017 Porras ................... B60K 11/04
(Continued)

FOREIGN PATENT DOCUMENTS

JP           5831108 B2    12/2015
KR      20120129076 A    11/2012
(Continued)

OTHER PUBLICATIONS

International Search Report and Written Opinion dated Feb. 22, 2018 from corresponding International Patent Application No. PCT/KR2017/013245 with English translation of International Search Report.

*Primary Examiner* — David D Hwu
(74) *Attorney, Agent, or Firm* — Dickinson Wright PLLC (57) ABSTRACT

The present invention relates to a vehicle thermal management system which is separately provided with the final heat dissipation unit of a cooling system for cooling electronic components required for the autonomous driving of a vehicle, optimizes the modularization of units, and thereby promotes the reduction of a package.

15 Claims, 6 Drawing Sheets

(51) Int. Cl.
  *B60H 1/22* (2006.01)
  *B60H 1/32* (2006.01)
  *B60R 16/03* (2006.01)
  *B60K 11/02* (2006.01)
(52) U.S. Cl.
  CPC ............. *B60H 1/32* (2013.01); *B60K 11/02* (2013.01); *B60R 16/03* (2013.01); *B60H 2001/006* (2013.01); *B60H 2001/00307* (2013.01); *B60Y 2306/05* (2013.01)
(58) Field of Classification Search
  CPC .... B60H 2001/00307; B60H 2001/006; B60K 11/02; B60R 16/03; B60Y 2306/05
  USPC .......................................................... 165/201
  See application file for complete search history.

(56) References Cited

U.S. PATENT DOCUMENTS

| | | | |
|---|---|---|---|
| 2016/0248129 A1* | 8/2016 | Dunham | H01M 10/663 |
| 2017/0159545 A1* | 6/2017 | Onishi | B60K 11/02 |
| 2018/0117985 A1* | 5/2018 | Kim | F25B 25/005 |

FOREIGN PATENT DOCUMENTS

| | | |
|---|---|---|
| KR | 101283592 B1 | 7/2013 |
| KR | 20140106788 A | 9/2014 |
| KR | 101646445 B1 | 8/2016 |

* cited by examiner

THERMAL MANAGEMENT SYSTEM FOR VEHICLE

CROSS-REFERENCE TO RELATED APPLICATIONS

This application is a U.S. National Stage of International Application No. PCT/KR2017/013245, filed Nov. 21, 2017, which claims the benefit and priority of KR 10-2016-0165989 filed Dec. 7, 2016. The entire disclosures of each of the above applications are incorporated herein by reference.

TECHNICAL FIELD

The present invention relates to a thermal management system for a vehicle, and more particularly, to a thermal management system for a vehicle capable of cooling or heating electronic devices for an autonomous system.

BACKGROUND ART

In general, an autonomous system for a vehicle includes electronic devices, such as a lidar, a radar, a sensor, and so on. For autonomous driving of the vehicle, a series of thermal managements for cooling or heating electric parts including the electronic devices are essentially demanded.

In the meantime, U.S. Pat. No. 7,841,431 (Nov. 30, 2010) discloses a thermal management system for a vehicle including power train cooling subsystem, a refrigeration subsystem, a battery cooling subsystem, and a heating, ventilation and cooling (HVAC) subsystem.

A conventional thermal management system for a vehicle includes a cooling subsystem, an HVAC subsystem having a first refrigerant loop having a heating means and a cooling means, a power train cooling subsystem having a second refrigerant loop having a radiator, and a means for connecting the first refrigerant loop and the second refrigerant loop with each other to control them.

Refrigerant flows in the first refrigerant loop, and an electro-compressor, a condenser, an expansion valve, and a chiller are disposed on the first refrigerant loop in a flow direction of the refrigerant in order. The electro-compressor inhales and compresses the refrigerant, and then, discharges out in a gaseous state of high temperature and high pressure. The condenser exchanges heat between the refrigerant and the air blown from a blower. The expansion valve is arranged between the condenser and the chiller to expand the refrigerant. The chiller exchanges heat between refrigerant of low temperature and low pressure expanded in the expansion valve and coolant of a coolant line.

Moreover, coolant flows inside the second refrigerant loop, and the second refrigerant loop cools or heats a power transmission means, such as a motor. The coolant circulated and induced after being heat-exchanged with the motor flows toward a heat storing unit after passing a low temperature radiator (LTR) or flows toward the heat storing unit after being heat-exchanged with the refrigerant to be cooled while passing the chiller. The coolant line has a water pump for circulating the coolant.

When the conventional thermal management system breaks down, it cannot cool a heat source unit stably and continuously, and it may make autonomous driving impossible in case that the thermal management system is applied to an autonomous vehicle. In the worst case, it causes a breakdown in autonomous driving to cause an accident.

Furthermore, the conventional thermal management system may have a problem in applicability since requiring a package space occupying a large portion of the vehicle. Additionally, the conventional thermal management system may have a problem in that the size of the blower increases if a great deal of cooling performance is required in a small-sized space.

In addition, the conventional thermal management system, which has the structure for inhaling and discharging outdoor air in one module, has another problem in that cooling performance and efficiency are deteriorated since the heated air flows back and is inhaled, and in that it has weak points in durability and noise due to high pressure generated in the system if outdoor air temperature is high.

DISCLOSURE

Technical Problem

Accordingly, the present invention has been made in view of the above-mentioned problems occurring in the prior art, and it is an object of the present invention to provide a thermal management system for a vehicle, which includes a final heat radiation unit of a cooling system for cooling electronic components required for the autonomous driving of a vehicle and provides an optimized modularization of units, thereby reducing the size of a package.

Technical Solution

To accomplish the above object, according to the present invention, there is provided a thermal management system for a vehicle as a cooling system for cooling electronic components necessary for autonomous travelling of the vehicle, the thermal management system including: a first compressor for inhaling and compressing refrigerant and discharging out the compressed refrigerant in a gaseous state of high temperature and high pressure, a condenser for condensing the refrigerant, a first expansion valve for expanding the refrigerant, and a chiller for absorbing heat by exchanging heat between the refrigerant and coolant, which are disposed in a first refrigerant line in order, wherein the condenser is a water cooled condenser for radiating heat by exchanging heat between the refrigerant and the coolant. The thermal management system for a vehicle further includes: a first coolant line passing through the chiller while exchanging heat with the electronic components; and a second coolant line, to which a low-temperature radiator for exchanging heat between the coolant and air is connected, and which passes through the water cooled condenser, wherein the coolant exchanges heat with the chiller of the first refrigerant line or exchanges heat with the air using the low-temperature radiator by being connected with the second coolant line.

Moreover, the low-temperature radiator is disposed in an air-conditioning system which performs air-conditioning in the interior of the vehicle.

Furthermore, the low-temperature radiator is disposed separately from an air-conditioning system, which performs air-conditioning in the interior of the vehicle, and a cooling system for cooling the electronic components necessary for autonomous travelling of the vehicle.

Additionally, the low-temperature radiator is disposed at a lower portion of the vehicle facing the ground.

In addition, the first coolant line and the second coolant line are selectively communicated with each other.

Moreover, the thermal management system for a vehicle further includes: a third coolant line branching off from the first coolant line at the upstream side of the chiller and connected to the second coolant line at the upstream side of the low-temperature radiator; and a fourth coolant line branching off from the second coolant line at the downstream side of the low-temperature radiator and connected to the first coolant line at the downstream side of the chiller.

Furthermore, the thermal management system for a vehicle further includes: a first valve disposed at the branching point between the first coolant line and the third coolant line to control a flow of the coolant so that the coolant selectively flows to at least one among the chiller and the low-temperature radiator; and a second valve disposed at the branching point between the second coolant line and the fourth coolant line to control the flow of the coolant so that the coolant selectively flows to at least one among the water cooled condenser and the first coolant line.

Additionally, a chiller cooling mode is formed such that the coolant exchanged heat with the electronic components circulates along the first coolant line after being cooled in the chiller and the coolant inhaled in the water cooled condenser circulates along the second coolant line after radiating heat in the low-temperature radiator.

In addition, a radiator cooling mode is formed such that the coolant exchanged heat with the electronic components flows from the first coolant line to the second coolant line, is cooled in the low-temperature radiator, meets the first coolant line, and then, circulates to the electronic components.

Moreover, the thermal management system for a vehicle further includes: a first water pump disposed in the first coolant line for circulating the coolant; and a second water pump disposed in the second coolant line for circulating the coolant.

Furthermore, valves to which the second coolant line and the first coolant line are connected are controlled depending on a cooling thermal load of the electronic components.

Additionally, if the cooling thermal load of the electronic components is lower than a reference value, valves are operated to use the low-temperature radiator. If the thermal load is higher than the reference value, the valves are operated to cool the electronic components by using the chiller.

Moreover, the water cooled condenser, the first expansion valve, and the chiller are integrated into a single module.

Furthermore, an internal heat exchanger of a dual pipe structure for exchanging heat between the water cooled condenser and the chiller is disposed between the water cooled condenser and the chiller.

Additionally, the water cooled condenser, the internal heat exchanger, the first expansion valve, and the chiller are integrated into a single module.

In addition, a heat storing unit for storing a heat source for cooling or a heat source for heating, a first water pump for circulating the coolant, a heater for heating the coolant, and a coolant temperature sensor for sensing temperature of the coolant are disposed in the first coolant line. A package unit is formed in such a way that at least two among the heat storing unit the first water pump, the heater, and the coolant temperature sensor are integrated into a single module.

Advantageous Effects

As described above, the thermal management system for a vehicle according to the present invention can provide a compact-sized refrigerant circuit part, and reduce noise in the interior of the vehicle since the blower for cooling the low-temperature radiator is arranged on the outer face of the vehicle.

Moreover, the existing air cooled system for cooling a condenser by a blower is deteriorated in performance and efficiency due to a back flow of air of an aspirator, but the thermal management system according to the present invention can solve the problem of the existing system since the radiation part can be freely arranged at various locations of the outer face of the vehicle, such as the front portion, the lower portion, or other portions.

Furthermore, in case of the existing air cooled system for cooling the condenser by the blower, the heat exchanger and the blower of the cooling system for cooling the electronic components necessary for autonomous driving of the vehicle must be increased in size in order to increase cooling capacity. However, the water cooled condenser according to the present invention is relatively easy to increase the cooling capacity.

Additionally, the thermal management system for a vehicle according to the present invention can enhance productivity since the assembled number of connection portions among the components is reduced, and reduce costs by reducing the quantity of connected hoses. Moreover, the thermal management system for a vehicle according to the present invention can ease pressure drop of the coolant since the assembled number of the connected hoses is reduced, enhance efficiency since being sufficiently operated just by the water pump with low power, and reduce the size of the package since the entire components are integrated into one module.

MODE FOR INVENTION

Hereinafter, a technical structure of a thermal management system for a vehicle according to the present invention will be described in detail with reference to the accompanying drawings.

Figure 1:
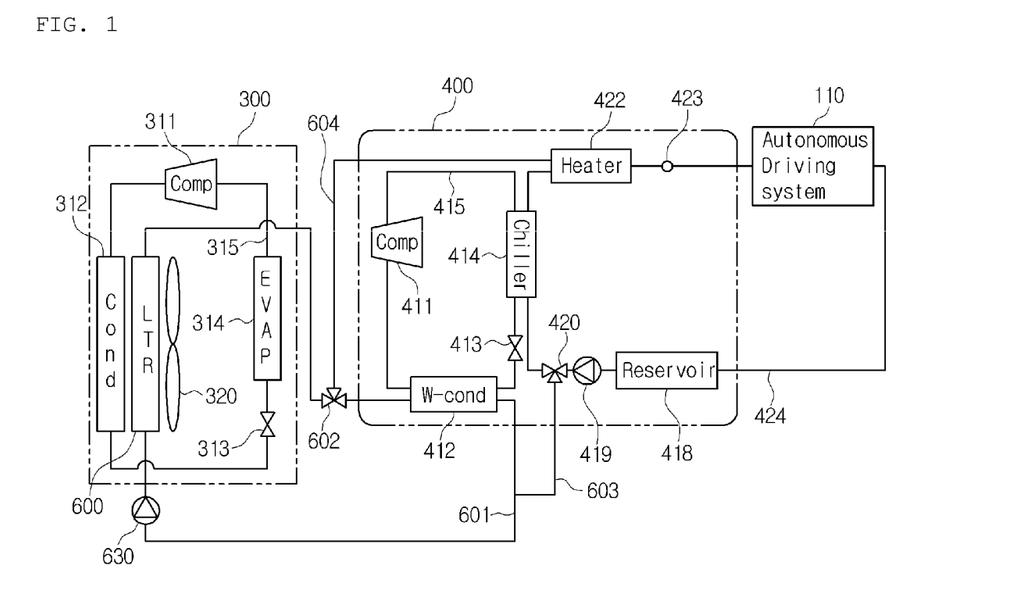
FIG. 1 is a view of a thermal management system for a vehicle according to a first preferred embodiment of the present invention.
Figure 2:
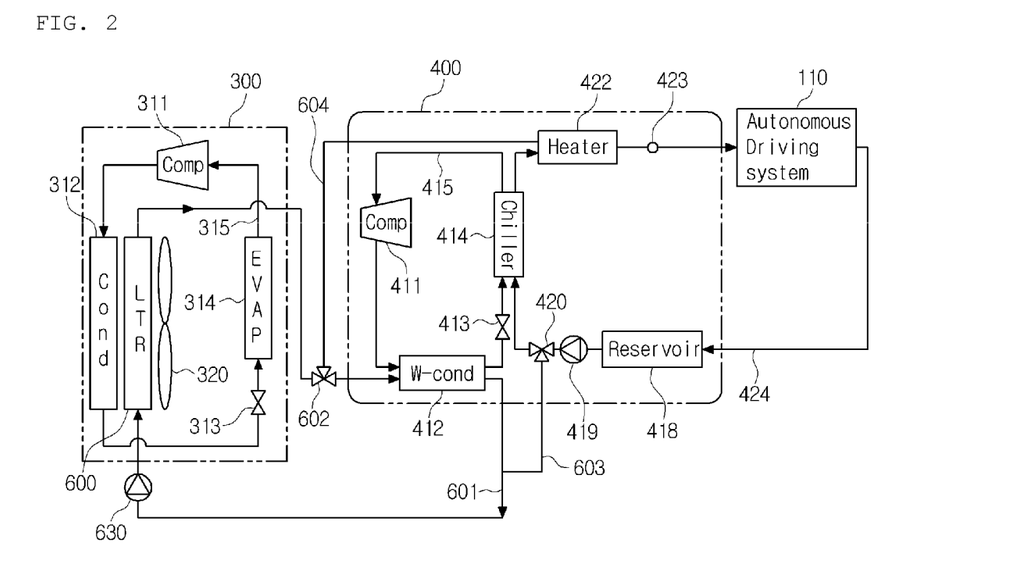
FIG. 2 is a view showing a chiller cooling mode of the thermal management system for a vehicle according to the first preferred embodiment of the present invention.
Figure 3:
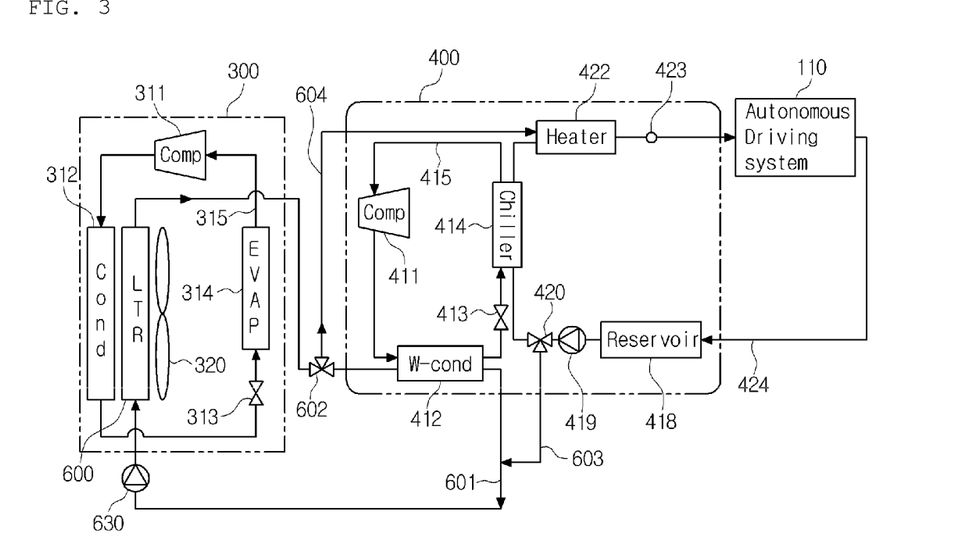
FIG. 3 is a view showing a radiator cooling mode of the thermal management system for a vehicle according to the first preferred embodiment of the present invention.

FIG. 1 is a view of a thermal management system for a vehicle according to a first preferred embodiment of the present invention, FIG. 2 is a view showing a chiller cooling mode of the thermal management system for a vehicle according to the first preferred embodiment of the present invention, and FIG. 3 is a view showing a radiator cooling mode of the thermal management system for a vehicle according to the first preferred embodiment of the present invention.

As shown in FIGS. 1 to 3, the thermal management system for the vehicle according to the first preferred embodiment of the present invention is to perform a series of thermal managements to cool or heat electronic components (electronic devices 110), such as a computer, a lidar, a radar, and a sensor of an autonomous vehicle, and includes a cooling system 400, which is a cooling module for cooling the electronic components required for autonomous driving of the vehicle.

The cooling system 400 includes a first refrigerant line 415 which is a flow passage of refrigerant; a first compressor 411, a water cooled condenser 412, a first expansion valve 413 for expanding the refrigerant, a chiller 414 for exchanging heat between the refrigerant and coolant, a first coolant line 424, a second coolant line 601, and a low-temperature radiator 600.

The first compressor 411 is disposed in the first refrigerant line 415, and inhales and compresses refrigerant, and then, discharges out in a gaseous state of high temperature and high pressure. It is preferable that the first compressor 422 be an electric compressor. The water cooled condenser 412 is disposed in the first refrigerant line 415 at the downstream side of the first compressor 411. The water cooled condenser 412 exchanges heat between the refrigerant and coolant, and then, radiates heat.

The first expansion valve 413 is disposed in the first refrigerant line 415 at the downstream side of the water cooled condenser 412, and expands the refrigerant. The chiller 414 is disposed in the first refrigerant line 415 at the downstream side of the first expansion valve 413, and sucks heat by exchanging heat between the refrigerant and the coolant. The first coolant line 424 is a flow passage of the coolant exchanged heat with the electronic components 110, and passes through the chiller 414.

The second coolant line 601 is a flow passage of the coolant, and passes through the water cooled condenser 412. The low-temperature radiator 600 is disposed in the second coolant line 601, and exchanges heat between the coolant and outdoor air. The low-temperature radiator 600 is disposed in an air-conditioning system 300, which is an air-conditioning module for performing air-conditioning of the interior of the vehicle, and may be arranged at the front of the vehicle.

Through the above configuration, the thermal management system for a vehicle according to the first embodiment of the present invention does not require additional low-temperature radiator but may utilize the existing low-temperature radiator of the air-conditioning system 300. Additionally, in order to cool the electronic components 110 of the autonomous system, a radiation unit (low-temperature radiator) in a refrigerant circuit of the cooling system 400 is detached from the cooling system 400 and is mounted on the outer face of a vehicle body to radiate heat in an air cooled manner. In this instance, the water cooled condenser 412 radiates heat in a water cooled manner.

The first coolant line 424 and the second coolant line 601 selectively communicate with each other. In more detail, the thermal management system for a vehicle according to the first preferred embodiment of the present invention includes a third coolant line 603, a fourth coolant line 604, a first valve 420, and a second valve 602.

The third coolant line 603 branches off from the first coolant line 424 at the upstream side of the chiller 424, and is connected to the second coolant line 601 at the upstream side of the low-temperature radiator 600. The fourth coolant line 604 branches off from the second coolant line 601 at the downstream side of the low-temperature radiator 600 and is connected to the first coolant line 424 at the downstream side of the chiller 414.

The first valve 420 is disposed at the branching point between the first coolant line 424 and the third coolant line 603, and controls a flow of the coolant so that the coolant selectively flows to at least one among the chiller 414 and the low-temperature radiator 600.

The second valve 602 is disposed at the branching point between the second coolant line 601 and the fourth coolant line 604, and controls the flow of the coolant so that the coolant selectively flows to at least one among the water cooled condenser 412 and the first coolant line 424. The first valve 420 and the second valve 602 may be in the form of a three-way valve.

Moreover, the thermal management system further includes a first water pump 419 disposed in the first coolant line 424 to circulate the coolant, and a second water pump 630 disposed in the second coolant line 601 to circulate the coolant. Furthermore, the thermal management system further includes a heat storing unit 418 for storing a heat source for cooling or a heat source for heating, and a coolant temperature sensor 423 for sensing temperature of the coolant in the first coolant line 424.

The thermal management system for a vehicle controls the first valve 420 and the second valve 602, to which the second coolant line 601 and the first coolant line 424 are respectively connected, depending on a cooling thermal load of the electronic components 110. That is, if the cooling thermal load of the electronic components 110 is lower than a reference value, the thermal management system operates the first valve 420 and the second valve 602 to use the low-temperature radiator 600. In addition, if the thermal load is higher than the reference value, the thermal management system operates the first valve 420 and the second valve 602 to cool the electronic components 110 by using the chiller 414.

The air-conditioning system 300 includes a second refrigerant line 315, which is a flow passage of the refrigerant, a second compressor 311, a second condenser 312 for exchanging heat between the refrigerant and air to condense the refrigerant, a second expansion valve 313 for expanding the refrigerant, an evaporator 314, and a second blower 320 for blowing air to the second condenser 312.

The second compressor 311 inhales and compresses the refrigerant, and then, discharges the compressed refrigerant in a gaseous state of high temperature and high pressure. The second condenser 312 exchanges heat between the air blown from the second blower 320 and the refrigerant of high temperature and high pressure discharged from the second compressor 311.

The evaporator 314 is disposed inside an air-conditioning case, and exchanges heat between the refrigerant and the air discharged to the interior of the vehicle. Besides the evaporator, a heater core, a heating means such as a PTC heater, a temperature control door, a blowing means for inducing indoor air or outdoor air, and others may be disposed inside the air-conditioning case.

The low-temperature radiator 600 is disposed side by side with the second condenser 312, and radiates heat by the air blown by the second blower 320. In this instance, the low-temperature radiator 600 and the second condenser 312 is disposed on a front grill side of the vehicle, thereby increases a heat radiation effect by travelling wind when the vehicle is travelling.

The thermal management system for a vehicle according to the first preferred embodiment of the present invention has a chiller cooling mode and a radiator cooling mode.

Referring to FIG. 2, in the chiller cooling mode, the coolant exchanged heat with the electronic components 110 is cooled in the chiller 414, and then, circulates along the first coolant line 424. The coolant inhaled in the water cooled condenser 412 radiates heat in the low-temperature radiator 600, and then, circulates along the second coolant line 601. That is, the first coolant line 424 and the second coolant line 601 are blocked from each other by the first valve 420 and the second valve 602, so that the coolants in the two coolant lines are individually circulated.

Referring to FIG. 3, in the radiator cooling mode, the coolant exchanged heat with the electronic components 110 flows from the first coolant line 424 to the second coolant line 601, and is cooled in the low-temperature radiator 600. After that, the coolant meets the first coolant line 424, and then, circulates to the electronic components 110. That is, the first coolant line 424 and the second coolant line 601 communicate with each other by the first valve 420 and the second valve 602, and then, circulates in just one line.

In the meantime, besides the chiller cooling mode and the radiator cooling mode, a third mode for making the coolant flowing in the first coolant line 424 flow to the chiller 414 and the radiator 600 may be added.

Figure 4:
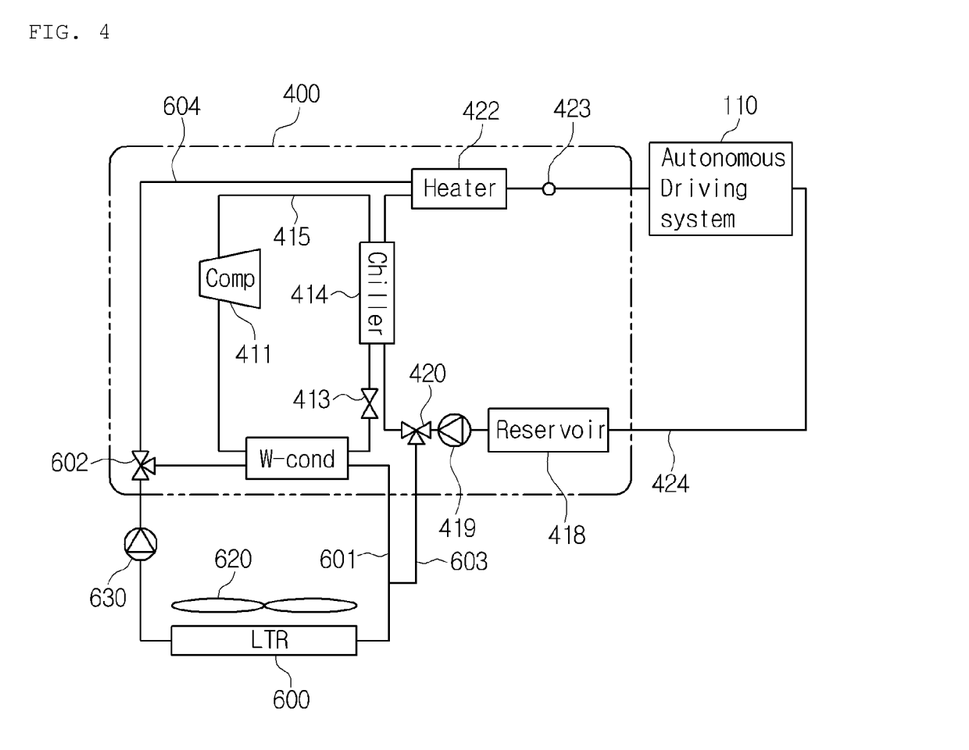
FIG. 4 is a view of a thermal management system for a vehicle according to a second preferred embodiment of the present invention.
Figure 5:
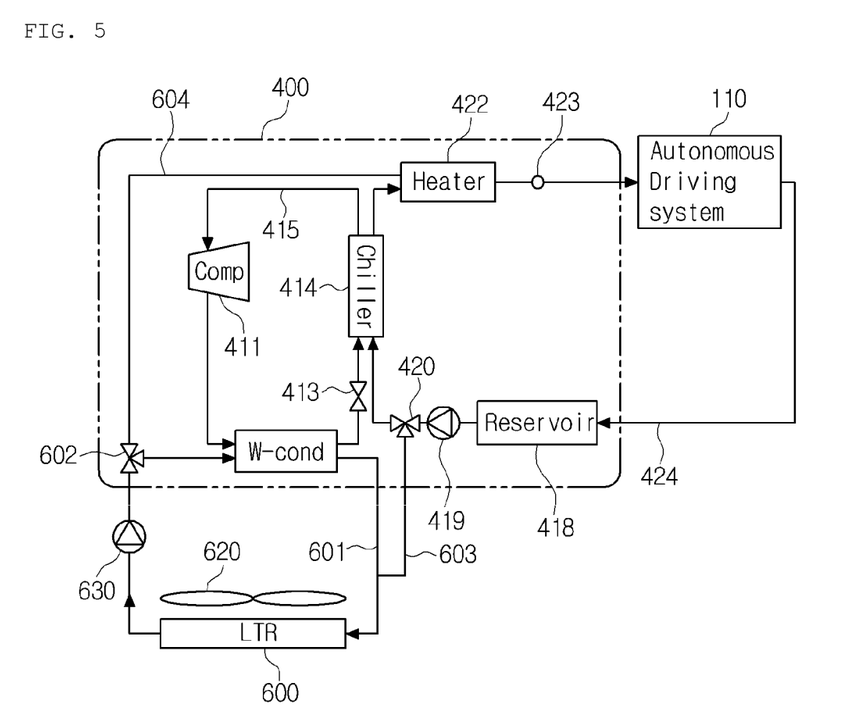
FIG. 5 is a view showing a chiller cooling mode of the thermal management system for a vehicle according to the second preferred embodiment of the present invention.
Figure 6:
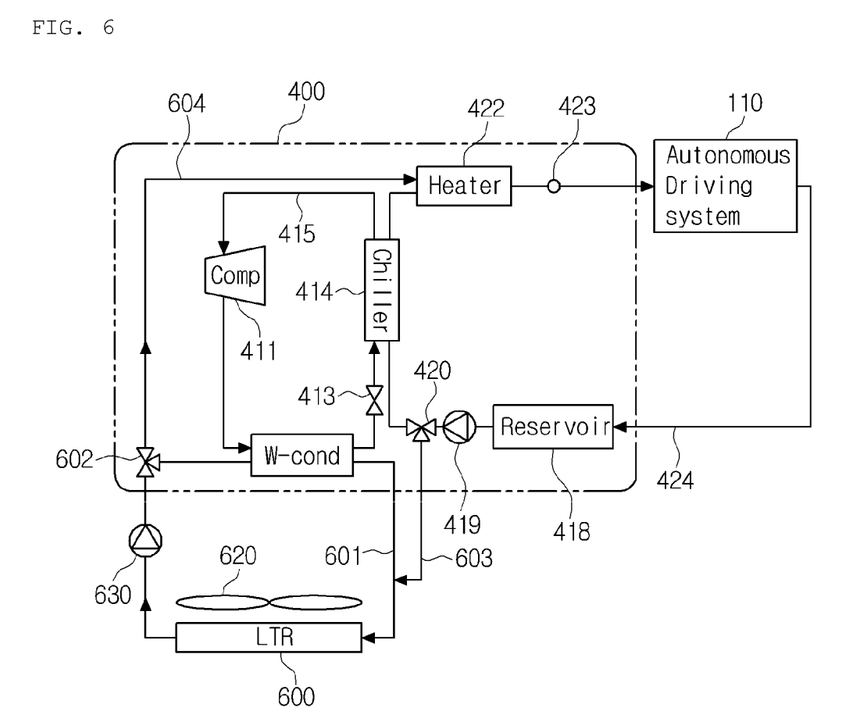
FIG. 6 is a view showing a radiator cooling mode of the thermal management system for a vehicle according to the second preferred embodiment of the present invention.

FIG. 4 is a view of a thermal management system for a vehicle according to a second preferred embodiment of the present invention, FIG. 5 is a view showing a chiller cooling mode of the thermal management system for a vehicle according to the second preferred embodiment of the present invention, and FIG. 6 is a view showing a radiator cooling mode of the thermal management system for a vehicle according to the second preferred embodiment of the present invention.

As shown in FIGS. 4 to 6, the thermal management system for a vehicle according to the second preferred embodiment of the present invention includes a low-temperature radiator 600, which is disposed separately from the air-conditioning system 300 for performing air-conditioning of the interior of the vehicle and the cooling system 400 for cooling the electronic components necessary for autonomous driving of the vehicle.

The low-temperature radiator according to the first preferred embodiment is arranged at the front side of the vehicle and is the radiator of the existing air-conditioning system. However, the low-temperature radiator according to the second preferred embodiment is arranged separately not only from the cooling system 400 but also from the air-conditioning system 300. Preferably, the low-temperature radiator 600 is disposed at a lower portion of the vehicle facing the ground.

The thermal management system for a vehicle according to the second preferred embodiment of the present invention includes a first refrigerant line 415, which is a flow passage of refrigerant, a first compressor 411, a water cooled condenser 412, a first expansion valve 413 for expanding the refrigerant, a chiller 414 for exchanging heat between the refrigerant and coolant, a first coolant line 424, a second coolant line 601, and a low-temperature radiator 600.

The first compressor 411 is disposed in the first refrigerant line 415, and inhales and compresses refrigerant, and then, discharges out in a gaseous state of high temperature and high pressure. It is preferable that the first compressor 422 be an electric compressor. The water cooled condenser 412 is disposed in the first refrigerant line 415 at the downstream side of the first compressor 411. The water cooled condenser 412 exchanges heat between the refrigerant and coolant, and then, radiates heat.

The first expansion valve 413 is disposed in the first refrigerant line 415 at the downstream side of the water cooled condenser 412, and expands the refrigerant. The chiller 414 is disposed in the first refrigerant line 415 at the downstream side of the first expansion valve 413, and sucks heat by exchanging heat between the refrigerant and the coolant. The first coolant line 424 is a flow passage of the coolant exchanged heat with the electronic components 110, and passes through the chiller 414.

The second coolant line 601 is a flow passage of the coolant, and passes through the water cooled condenser 412. The low-temperature radiator 600 is disposed in the second coolant line 601, and exchanges heat between the coolant and outdoor air blown by the first blower 620. The low-temperature radiator 600 is separately arranged at the lower portion of the vehicle, and preferably, forms a tilted air passageway structure so that travelling wind blows toward the low-temperature radiator 600 when the vehicle travels.

The first coolant line 424 and the second coolant line 601 selectively communicate with each other. In more detail, the thermal management system for a vehicle according to the second preferred embodiment of the present invention includes a third coolant line 603, a fourth coolant line 604, a first valve 420, and a second valve 602.

The third coolant line 603 branches off from the first coolant line 424 at the upstream side of the chiller 424, and is connected to the second coolant line 601 at the upstream side of the low-temperature radiator 600. The fourth coolant line 604 branches off from the second coolant line 601 at the downstream side of the low-temperature radiator 600 and is connected to the first coolant line 424 at the downstream side of the chiller 414.

The first valve 420 is disposed at the branching point between the first coolant line 424 and the third coolant line 603, and controls a flow of the coolant so that the coolant selectively flows to at least one among the chiller 414 and the low-temperature radiator 600. The second valve 602 is disposed at the branching point between the second coolant line 601 and the fourth coolant line 604, and controls the flow of the coolant so that the coolant selectively flows to at least one among the water cooled condenser 412 and the first coolant line 424. The first valve 420 and the second valve 602 may be in the form of a three-way valve.

Moreover, the thermal management system further includes a first water pump 419 disposed in the first coolant line 424 to circulate the coolant, and a second water pump 630 disposed in the second coolant line 601 to circulate the coolant. Furthermore, the thermal management system further includes a heat storing unit 418 for storing a heat source for cooling or a heat source for heating, and a coolant temperature sensor 423 for sensing temperature of the coolant in the first coolant line 424.

Referring to FIG. 5, in the chiller cooling mode, the coolant exchanged heat with the electronic components 110 is cooled in the chiller 414, and then, circulates along the first coolant line 424. The coolant inhaled in the water cooled condenser 412 radiates heat in the low-temperature radiator 600, and then, circulates along the second coolant line 601. That is, the first coolant line 424 and the second coolant line 601 are blocked from each other by the first valve 420 and the second valve 602, so that the coolants in the two coolant lines are individually circulated.

Referring to FIG. 6, in the radiator cooling mode, the coolant exchanged heat with the electronic components 110 flows from the first coolant line 424 to the second coolant line 601, and is cooled in the low-temperature radiator 600. After that, the coolant meets the first coolant line 424, and then, circulates to the electronic components 110. That is, the first coolant line 424 and the second coolant line 601 communicate with each other by the first valve 420 and the second valve 602, and then, circulates in just one line.

In the meantime, besides the chiller cooling mode and the radiator cooling mode, a third mode for making the coolant flowing in the first coolant line 424 flow to the chiller 414 and the radiator 600 may be added.

In the first embodiment and the second embodiment, the chiller cooling mode and the radiator cooling mode are realized through the structure that the water cooled condenser is disposed, the means for radiating heat of the water cooled condenser is arranged at the front or the lower portion of the outer face of the vehicle, and the two three-way valves, namely, the first valve and the second valve, are mounted. So, since a blower, a blower motor and a duct structure can be removed from the cooling system for cooling the electronic components necessary for autonomous driving of the vehicle, the thermal management system for a vehicle according to the present invention can have the compact-sized refrigerant circuit part. Additionally, since the blower for cooling the low-temperature radiator is arranged outside the vehicle, the thermal management system for a vehicle according to the present invention can reduce noise in the interior of the vehicle.

Moreover, an existing air cooled system for cooling a condenser by a blower is deteriorated in performance and efficiency due to a back flow of air of an aspirator, but the thermal management system according to the present invention can solve the problem of the existing system since the radiation part can be freely arranged at various locations of the outer face of the vehicle, such as the front portion, the lower portion, or other portions.

Furthermore, in case of the existing air cooled system for cooling the condenser by the blower, the heat exchanger and the blower of the cooling system must be increased in size in order to increase cooling capacity. However, the water cooled condenser according to the present invention is relatively easy to increase the cooling capacity.

Figure 7:
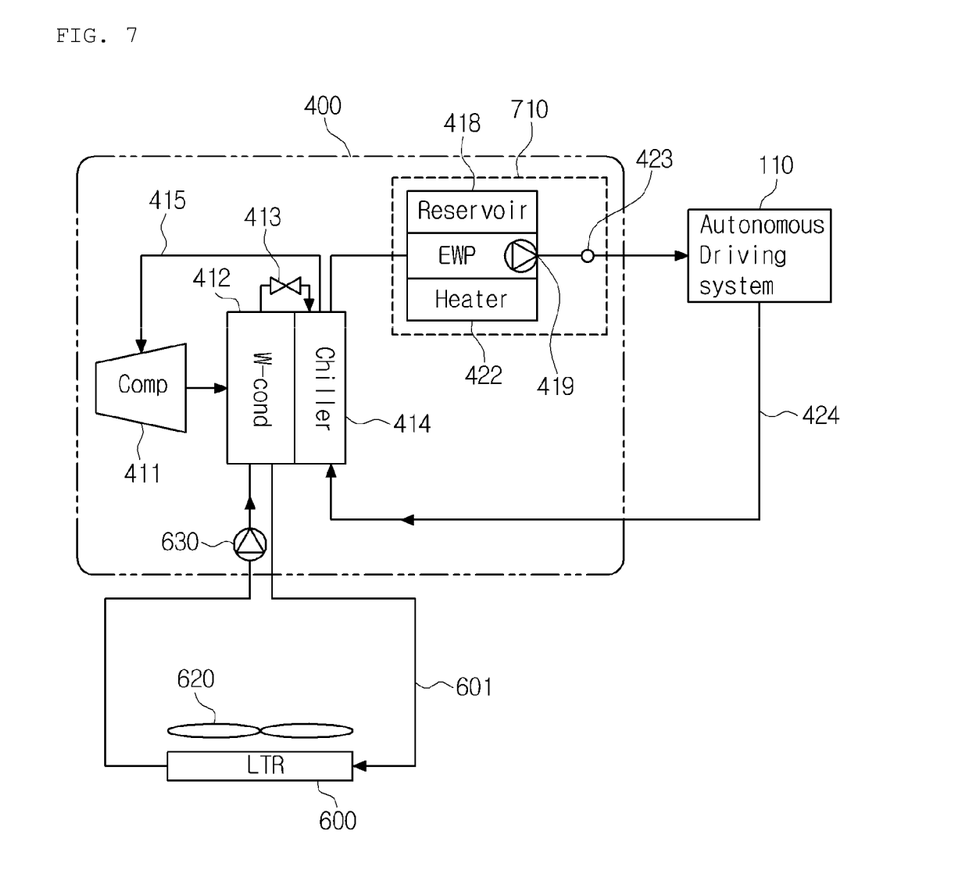
FIG. 7 is a view of a thermal management system for a vehicle according to a third preferred embodiment of the present invention.

FIG. 7 is a view of a thermal management system for a vehicle according to a third preferred embodiment of the present invention.

Referring to FIG. 7, the thermal management system for a vehicle according to the third preferred embodiment of the present invention includes a first refrigerant line 415, a first compressor 411, a water cooled condenser 412, a first expansion valve 413 for expanding refrigerant, a chiller 414 for exchanging heat between the refrigerant and coolant, a first coolant line 424, a second coolant line 601, a low-temperature radiator 600, and a first blower 620.

Moreover, in the first coolant line 424, the thermal management system for a vehicle further includes a heat storing unit 418 for storing a heat source for cooling or a heat source for heating, a first water pump 419 for circulating the coolant, a heater 422 for heating the coolant, and a coolant temperature sensor 423 for sensing temperature of the coolant. The thermal management system for a vehicle further includes a second water pump 630 disposed in the second coolant line 601.

Specifically, the water cooled condenser 412, the first expansion valve 413, and the chiller 414 are integrated into a single module. The water cooled condenser 412, the first expansion valve 413, and the chiller 414 may be integrated in a single block. That is, since the water cooled condenser 412 and the chiller 414 are made in the form of a single heat exchanger and the first expansion valve and a block are assembled into a single module, the thermal management system can be compact-sized.

Additionally, the thermal management system for a vehicle according to the third preferred embodiment of the present invention includes a package unit 710. The package unit 710 is formed in such a way that at least two among the heat storing unit 418 the first water pump 419, the heater 422, and the coolant temperature sensor 423 are integrated into a single module.

Through the above structure, the thermal management system for a vehicle according to the present invention can enhance productivity since the assembled number of connection portions among the components is reduced, and reduce costs by reducing the quantity of connected hoses. Moreover, because the assembled number of the connected hoses is reduced, the thermal management system can ease pressure drop of the coolant, and enhance efficiency since being sufficiently operated just by the water pump with low power. Furthermore, since the entire components are integrated into one module, the package can be reduced in size.

Figure 8:
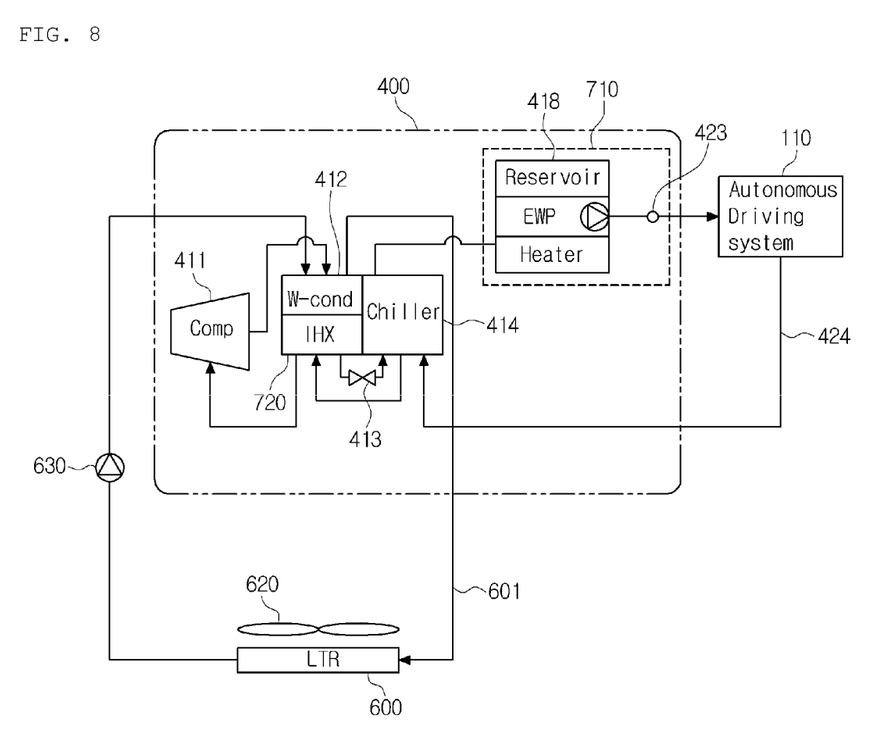
FIG. 8 is a view of a thermal management system for a vehicle according to the third preferred embodiment of the present invention.

FIG. 8 is a view of a thermal management system for a vehicle according to the third preferred embodiment of the present invention. Referring to FIG. 8, the thermal management system for a vehicle according to the fourth preferred embodiment of the present invention includes a first refrigerant line 415, a first compressor 411, a water cooled condenser 412, a first expansion valve 413 for expanding refrigerant, an internal heat exchanger (IHX) 720, a chiller 414 for exchanging heat of coolant, a first coolant line 424, a second coolant line 601, a low-temperature radiator 600, and a first blower 620.

Moreover, in the first coolant line 424, the thermal management system for a vehicle further includes a heat storing unit 418 for storing a heat source for cooling or a heat source for heating, a first water pump 419 for circulating the coolant, a heater 422 for heating the coolant, and a coolant temperature sensor 423 for sensing temperature of the coolant. The thermal management system for a vehicle further includes a second water pump 630 disposed in the second coolant line 601.

The internal heat exchanger 720 has a dual pipe structure, and is disposed between the water cooled condenser 412 and the chiller 414 to exchange heat between the water cooled condenser 412 and the chiller 414. The water cooled condenser 412, the internal heat exchanger 720, the first expansion valve 413, and the chiller 414 are integrated into a single module in a block. That is, the water cooled condenser 412, the internal heat exchanger 720, and the chiller 414 are made in the form of a single heat exchanger, and the first expansion valve and the block are assembled into a single module to be compact-sized.

The water cooled condenser 412 is a water cooled type condenser for cooling the refrigerant using coolant, but it is difficult for the water cooled condenser 412 to provide sufficient cooling capacity. The internal heat exchanger 720 can secure sufficient supercooling.

That is, the refrigerant of the first compressor 411 is first cooled by the coolant while passing through the water cooled condenser 412, is second supercooled by the refrigerant existing at the rear end of the chiller 414, and then, flows into the chiller 414 through the first expansion valve 413. The refrigerant flowed into the chiller 414 cools the coolant, and then, returns to the first compressor 411 through the internal heat exchanger 720 to circulate.

As previously described, in the detailed description of the invention, having described the detailed exemplary embodiments of the invention, it should be apparent that modifications and variations can be made by persons skilled without deviating from the spirit or scope of the invention. Therefore, it is to be understood that the technical protective scope of the present invention should be defined by the technical idea of the attached claims.

The invention claimed is:

1. A thermal management system for a vehicle as a cooling system for cooling electronic components necessary for autonomous travelling of the vehicle, the thermal management system comprising:
    a first compressor for inhaling and compressing refrigerant and discharging out the compressed refrigerant in a gaseous state of high temperature and high pressure, a condenser for condensing the refrigerant, a first expansion valve for expanding the refrigerant, and a chiller for absorbing heat by exchanging heat between the refrigerant and coolant, which are disposed in a first refrigerant line in order,
    wherein the condenser is a water cooled condenser for radiating heat by exchanging heat between the refrigerant and the coolant,
    further comprising:
    a first coolant line passing through the chiller while exchanging heat with the electronic components; and a second coolant line, to which a low-temperature radiator for exchanging heat between the coolant and air is connected, and which passes through the water cooled condenser,
    wherein the coolant exchanges heat with the chiller of the first refrigerant line or exchanges heat with the air using the low-temperature radiator by being connected with the second coolant line,
    wherein the first coolant line and the second coolant line are selectively communicated with each other,
    wherein a third coolant line branches off from the first coolant line at the upstream side of the chiller and is connected to the second coolant line at the upstream side of the low-temperature radiator,
    wherein a fourth coolant line branches off from the second coolant line at the downstream side of the low-temperature radiator and is connected to the first coolant line at the downstream side of the chiller.

2. The thermal management system according to claim 1, wherein the low-temperature radiator is disposed in an air-conditioning module which performs air-conditioning in the interior of the vehicle.

3. The thermal management system according to claim 1, wherein the low-temperature radiator is disposed separately from an air-conditioning module, which performs air-conditioning in the interior of the vehicle, and a cooling module for cooling the electronic components necessary for autonomous travelling of the vehicle.

4. The thermal management system according to claim 3, wherein the low-temperature radiator is disposed at a lower portion of the vehicle facing the ground.

5. The thermal management system according to claim 1, further comprising:
    a first valve disposed at the branching point between the first coolant line and the third coolant line to control a flow of the coolant so that the coolant selectively flows to at least one among the chiller and the low-temperature radiator; and
    a second valve disposed at the branching point between the second coolant line and the fourth coolant line to control the flow of the coolant so that the coolant selectively flows to at least one among the water cooled condenser and the first coolant line.

6. The thermal management system according to claim 1, wherein a chiller cooling mode is formed such that the coolant exchanged heat with the electronic components circulates along the first coolant line after being cooled in the chiller and the coolant inhaled in the water cooled condenser circulates along the second coolant line after radiating heat in the low-temperature radiator.

7. The thermal management system according to claim 1, wherein a radiator cooling mode is formed such that the coolant exchanged heat with the electronic components flows from the first coolant line to the second coolant line, is cooled in the low-temperature radiator, meets the first coolant line, and then, circulates to the electronic components.

8. The thermal management system according to claim 1, further comprising:
    a first water pump disposed in the first coolant line for circulating the coolant; and a second water pump disposed in the second coolant line for circulating the coolant.

9. The thermal management system according to claim 1, wherein valves to which the second coolant line and the first coolant line are connected are controlled depending on a cooling thermal load of the electronic components.

10. The thermal management system according to claim 9, wherein if the cooling thermal load of the electronic components is lower than a reference value, valves are operated to use the low-temperature radiator, and
    wherein if the thermal load is higher than the reference value, the valves are operated to cool the electronic components by using the chiller.

11. The thermal management system according to claim 1, wherein the water cooled condenser, the first expansion valve, and the chiller are integrated into a single module.

12. The thermal management system according to claim 1, wherein an internal heat exchanger of a dual pipe structure for exchanging heat between the water cooled condenser and the chiller is disposed between the water cooled condenser and the chiller.

13. The thermal management system according to claim 12, wherein the water cooled condenser, the internal heat exchanger, the first expansion valve, and the chiller are integrated into a single module.

14. The thermal management system according to claim 1, wherein a heat storing unit for storing a heat source for cooling or a heat source for heating, a first water pump for circulating the coolant, a heater for heating the coolant, and a coolant temperature sensor for sensing temperature of the coolant are disposed in the first coolant line, and
    wherein a package unit is formed in such a way that at least two among the heat storing unit the first water pump, the heater, and the coolant temperature sensor are integrated into a single module.

15. A thermal management system for a vehicle as a cooling system for cooling electronic components necessary for autonomous travelling of the vehicle, the thermal management system comprising:
    a first compressor for inhaling and compressing refrigerant and discharging out the compressed refrigerant in a gaseous state of high temperature and high pressure, a condenser for condensing the refrigerant, a first expansion valve for expanding the refrigerant, and a chiller for absorbing heat by exchanging heat between the refrigerant and coolant, which are disposed in a first refrigerant line in order;

wherein the condenser is a water cooled condenser for radiating heat by exchanging heat between the refrigerant and the coolant;

a first coolant line passing through the chiller while exchanging heat with the electronic components; and a second coolant line, to which a low-temperature radiator for exchanging heat between the coolant and air is connected, and which passes through the water cooled condenser;

wherein the coolant exchanges heat with the chiller of the first refrigerant line or exchanges heat with the air using the low-temperature radiator by being connected with the second coolant line;

wherein the first coolant line and the second coolant line are selectively communicated with each other;

wherein a chiller cooling mode is formed such that the coolant exchanged heat with the electronic components circulates along the first coolant line after being cooled in the chiller and the coolant inhaled in the water cooled condenser circulates along the second coolant line after radiating heat in the low-temperature radiator.

\* \* \* \* \*